Patented May 30, 1950

2,509,511

UNITED STATES PATENT OFFICE 2,509,511

METHOD OF TREATING CASTOR OIL BEAN CAKE

Eliane le Breton and Paul Gregory, Paris, France, assignors to "Societe Organico," Paris, France, a corporation of France No Drawing. Application August 4, 1947, Serial No. 766,084. In France May 14, 1946

Section 1, Public Law 690, August 8, 1946
Patent expires May 14, 1966

2 Claims. (Cl. 99—14)

Certain materials of vegetable origin and in particular the cakes obtained in pressing and extracting oil from oil-bearing seeds contain valuable nutrient elements; certain oil-cakes would be of particular interest in the preparation of food products, if they could be first freed of any objectionable and sometimes toxic substances they may contain. Such is the case of the commercial oil-cake of the castor-oil bean or Ricinus.

Such oil-cake which is poor in starchy materials but rich in protein frequently contains, as discharged from the oil-works, 4.3% nitrogen (24% protein). When the cake is one derived from seeds which have been decorticated and thoroughly stripped of oil in an oil extracting operation, its content may be from 8 to 10% nitrogen or from 46 to 57% protein.

Castor-oil cake is therefore rich in protein materials; unfortunately it is well known to contain poisonous material (namely a poisonous protein) which renders it unsuitable for use as feed for animals or man. Due to the presence of said poisonous material therein, the castor oil press cake or the proteinous materials which may be extracted therefrom by the methods previously known have not been suitable for use as food products, but are used largely as fertilizers. Castor oil bean press cake, as is well known, contains a highly poisonous material. Hence castor oil cake, (or "castor pommace") is not a suitable stock food, despite its high content of proteins.

It has been tried heretofore, to extract the poisonous material from castor oil bean press cake, but such trials were ineffective since no known organic solvents effectively remove the poisonous protein, and aqueous solvents for the poisonous protein also leach out soluble edible albumins. Methods of such type moreover involve an obvious hazard, inasmuch as no test is known at present which would make it possible to ascertain in a positive and simple way that the elimination of the poisonous material is complete and that the product obtained is actually quite safe for consumption, by man or animals.

The method forming the subject matter of our invention consists of totally destroying in situ the internal links of the objectionable or poisonous proteins, by means of a treatment operative to degrade the albuminoid material until the constituent amino-acids in its molecule have been totally released. Owing to the fact that toxicity of said albumins results from their peculiar structure, it is possible by modifying the latter to accomplish the desired result positively and radically.

One practical way of achieving such destruction in situ of the poisonous proteins, which is particularly applicable to the treatment of castor-oil cake, consists according to the invention of causing a hydrolytic decomposition of all of the protein substances contained in the material being treated by means of a hydrolysis adapted to resolve all of said proteins as a whole into their constituent amino-acids.

In this way, toxicity is completely suppressed; furthermore, the amino-acids resulting from the poisonous proteins are usable (edible) just as the others.

Hydrolysis is a uniform and safe method, which may safely be put into the hands of commercial chemists; all factors remaining equal, i. e. temperature, pressure, pH, the poisonous protein is always destroyed and the hydrolysis always progresses to the same extent. A biological control is effected once for all and thereafter the hydrolysis process is simply checked by means of a quick chemical test.

In applying our method, any type of hydrolysis reaction may be used. It appears however that best results from a practical standpoint are obtained, by an acidic hydrolysis, especially in the presence of a strong mineral acid such as hydrochloric acid or phosphoric acid.

In the case of hydrolysis with hydrochloric acid, neutralization should be effected upon completion of the acid hydrolysis reaction, by means of sodium hydroxide or sodium carbonate, and the sodium chloride thus formed may without any inconvenience be left in the final product. In the case of hydrolysis by phosphoric acid, such neutralization may desirably be effected with lime, since the calcium phosphate formed further enhances the nutrient value of the final product.

Merely by way of illustration and not of limitation, the following example is given of a procedure for treating castor-oil cake according to our improved method:

The cake after having been if necessary suitably comminuted is mixed with twice its volume of a hydro-chloric acid solution containing 1.5 normal hydrochloric acid that is containing about 55 g. pure HCl per liter.

The mixture is heated to the boiling point for four hours at atmospheric pressure; the duration of this treatment may be reduced by operating under pressure at higher temperatures. Thus, said duration may be brought down to two hours at 110–115° C. (under superatmospheric pressure).

It is to be noted that the reaction which produces the destruction of the poisonous protein requires substantially less time than the above mentioned figures; it is desirable however to use sufficient times of treatment to assure that the treated material is penetrated thoroughly so as to make for complete safety and to completely solubilize all of the protein materials.

Neutralization is then accomplished by adding a suitable amount of caustic soda. Then by a centrifugal or any other equivalent process, the unreacted cellulose and other substances which have been maintained in a solid state can be removed.

The solution recovered, which contains all of the amino-acids is finally evaporated to the desired consistency, so as to obtain soup stock or a paste, or even a dry product, as desired.

In certain instances it is possible to destroy the poisonous proteins while preserving a certain amount of polypeptides; moreover the neutralized hydrolysates obtained may be completed by the admixture of subsidiary substances, for instance autolysates rich in tryptophane in particular; in this way, full-value food products may be prepared which are adapted not only to maintain but build up growth in human beings and animals.

We claim:

1. A process of producing an edible product which comprises heating one volume of the residue of castor oil beans after removal of the oil, for about two hours at about 110° to 115° C. with about two volumes of a solution containing about 55 g. pure HCl per liter, until the poisonous and non-poisonous proteins in said cake have become hydrolyzed, and thereafter neutralizing the product with soda, and separating the insolubles from the solution, such process being conducted before using said castor oil bean residue as a food.

2. A process of treating the residue of castor oil bean from which the castor oil has been removed, and which residue contains poison naturally included therein, which comprises mixing said residue before using the same as a food, in a comminuted condition, with water and a mineral acid selected from the group consisting of hydrochloric acid and phosphoric acid, such mixture having a sufficient concentration of such acid to effect hydrolysis of all the poisonous component of the castor oil bean residue and to effect hydrolysis of the proteins of the castor oil bean residue, subjecting the mixture of such castor oil bean residue and such mineral acid to heat to effect such hydrolysis, until the proteins of the castor oil bean residue and all of said poisonous component are converted into non-poisonous amino acids, substantially neutralizing any hydrochloric acid in said hydrolyzed product with soda and converting any phosphoric acid into calcium phosphate by adding lime, and removing insoluble residue of the bean meal from the solution.

ELIANE le BRETON.
PAUL GREGORY.

REFERENCES CITED

The following references are of record in the file of this patent:

UNITED STATES PATENTS

| Number | Name | Date |
|---|---|---|
| 2,241,927 | Sahyun | May 13, 1941 |
| 2,427,760 | Beique | Sept. 23, 1947 |

FOREIGN PATENTS

| Number | Country | Date |
|---|---|---|
| 698,200 | Germany | Oct. 3, 1940 |